Feb. 25, 1941. G. THILENIUS 2,233,354
INJECTION MOLDING MACHINE
Filed Dec. 5, 1936 4 Sheets-Sheet 1
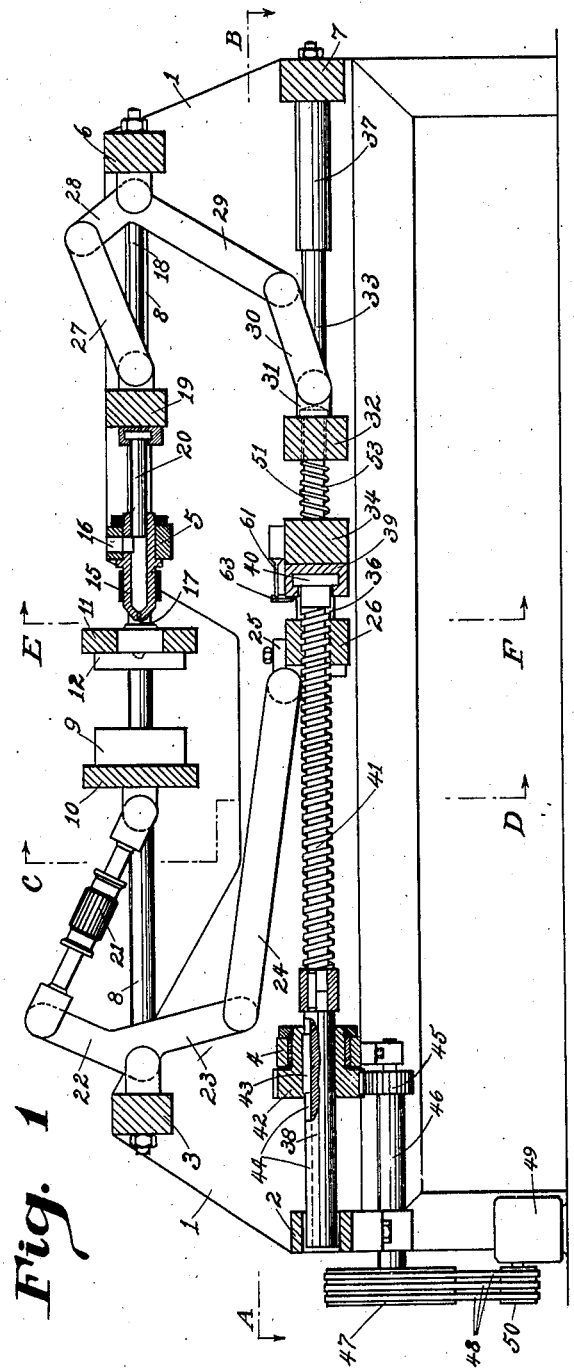
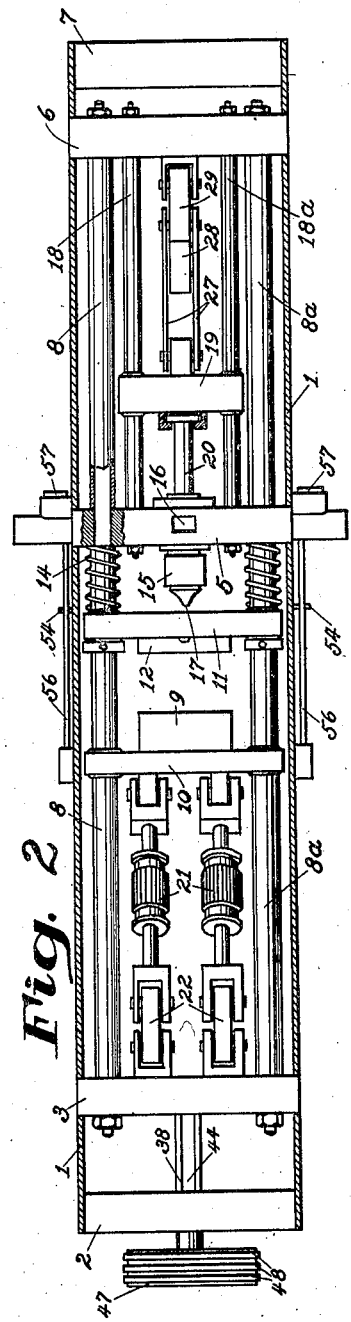
INVENTOR
Gerhard Thilenius
BY
HIS ATTORNEYS Feb. 25, 1941.  G. THILENIUS  2,233,354
INJECTION MOLDING MACHINE
Filed Dec. 5, 1936  4 Sheets-Sheet 2
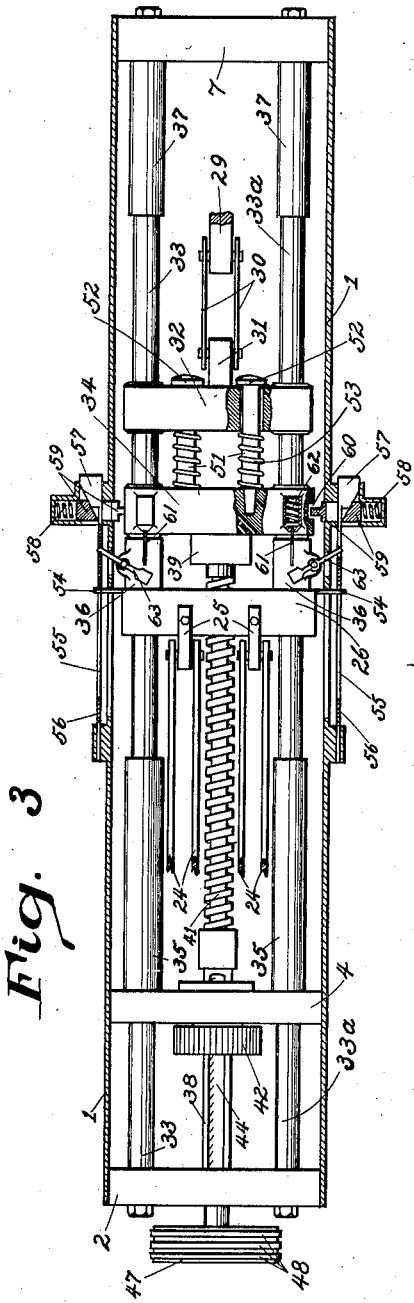
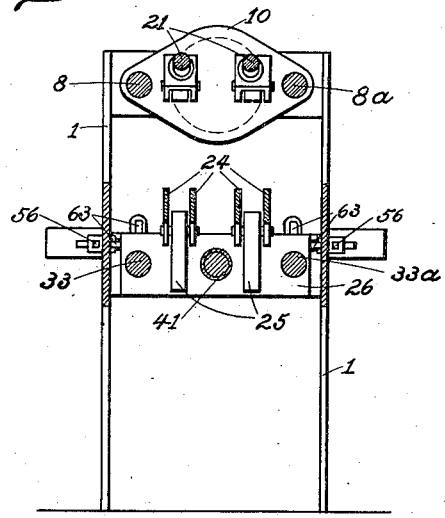
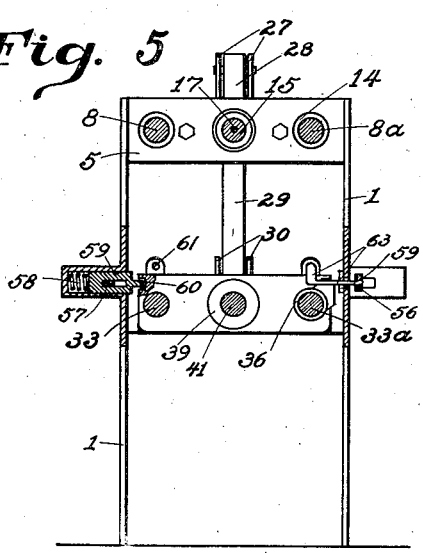
INVENTOR
Gerhard Thilenius
BY
HIS ATTORNEYS Feb. 25, 1941.  G. THILENIUS  2,233,354
INJECTION MOLDING MACHINE
Filed Dec. 5, 1936  4 Sheets-Sheet 3
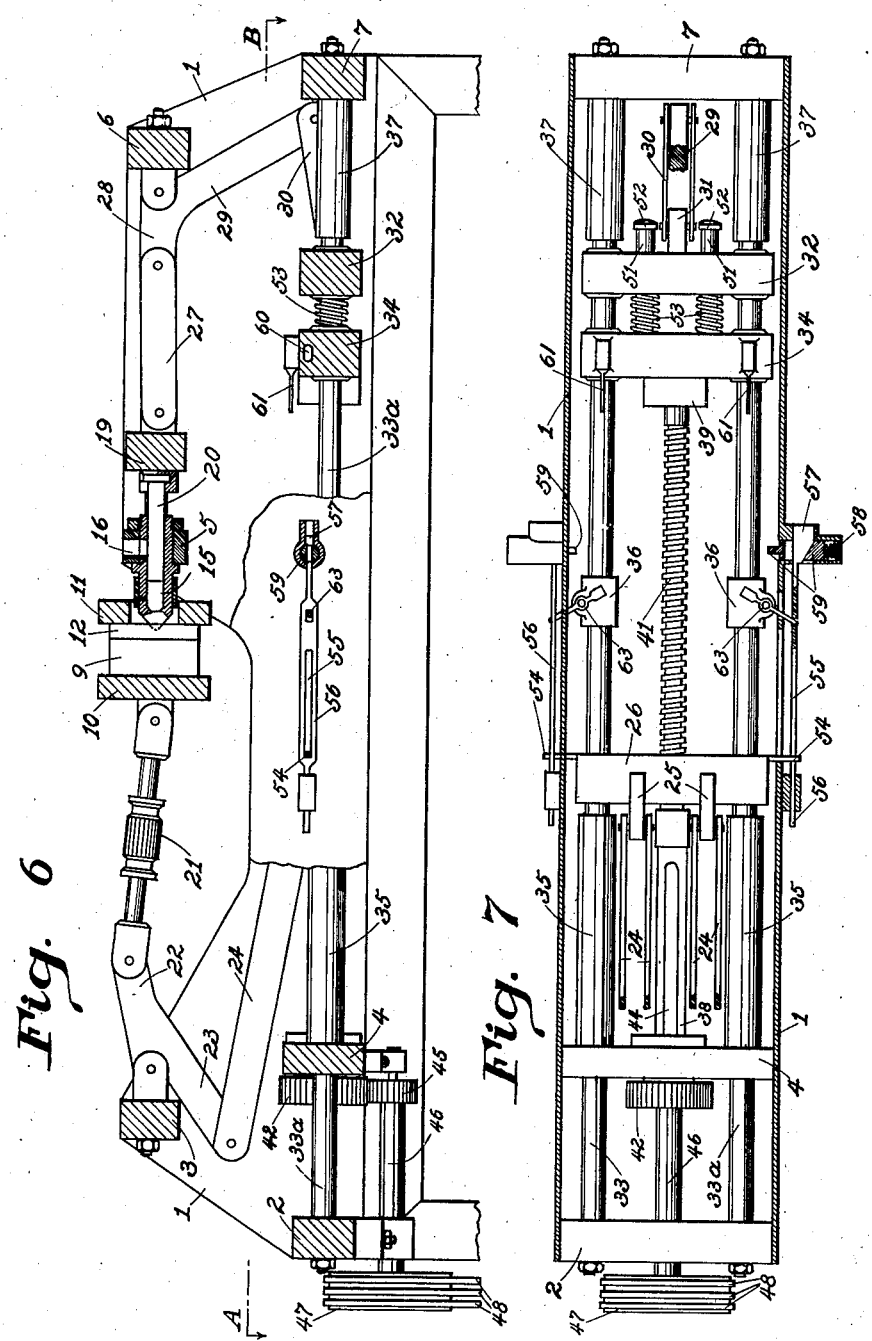
INVENTOR
Gerhard Thilenius
BY
HIS ATTORNEYS

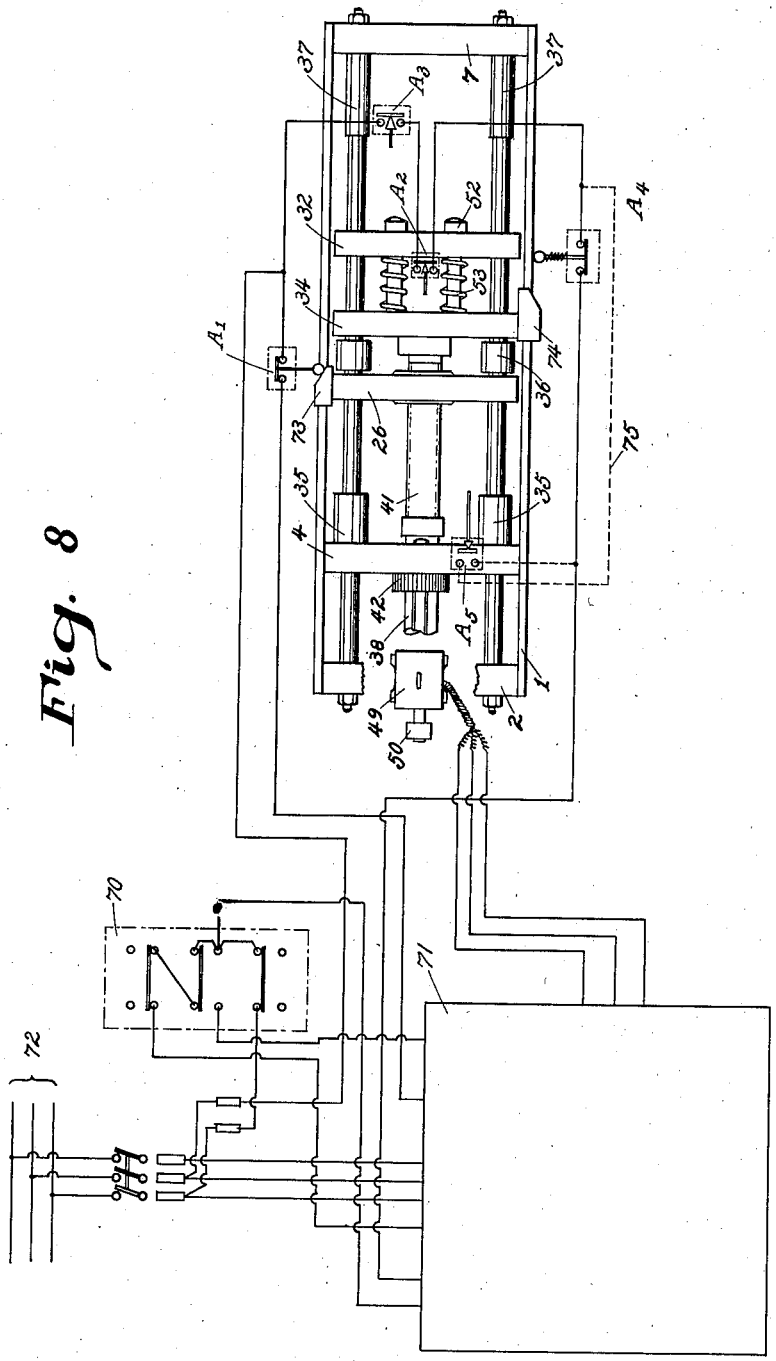

Patented Feb. 25, 1941

2,233,354

UNITED STATES PATENT OFFICE 2,233,354

INJECTION MOLDING MACHINE

Gerhard Thilenius, Cologne-Klettenberg, Germany, assignor to Eckert & Ziegler G. m. b. H., Cologne-Braunsfeld, Germany Application December 5, 1936, Serial No. 114,302
In Germany March 23, 1936

6 Claims. (Cl. 18—30)

This invention relates to an injection molding machine for the manufacture of molded articles from thermoplastic material. In a machine of this type, it is known to extrude thermoplastic material confined in a cylinder through a nozzle into a two-part injection mold by the high pressure action of a ram upon said material. Originally, all motions of the mold parts and of the ram were controlled manually, but automatic regulation was soon developed. For this latter purpose, hydraulic as well as electric driving means have been suggested. Hydraulic contrivances are disadvantageous due to complicated structure and dependence upon the generation of operating means at high pressure, such as compressed air. Also, known electric fittings are unsatisfactory because they require separate driving motors and gears of special construction for opening and closing the mold and for activating the ram.

It is therefore an object of my invention to provide improved automatic regulation of the machine. A further object is to coordinate the motions of the mold press and ram in desired succession. Another object are the means involving such coordination. I also aim to provide one single actuating means for said coordinating element. Moreover, it is my object to provide means for automatically controlling the action of said coordinating means with respect to the motions of the mold press and ram. This and further objects will clearly appear from the detailed description following hereafter.

The accompanying drawings illustrate the details and characteristic features of my new machine as one embodiment of the invention.

Fig. 1 shows a sectional view of the machine.

Fig. 2 is a plan view.

Fig. 3 is a sectional view along line A—B of Fig. 1.

Fig. 4 is a sectional view along line C—D and Fig. 5 is a sectional view along line E—F of Fig. 1.

Fig. 6 is a sectional view of the machine somewhat similar to that of Fig. 1, but showing the machine in a different operating position.

Fig. 7 is similar to Fig. 3 and is a sectional view along line A—B of Fig. 6.

Fig. 8 is a diagrammatical view of the wiring system.

Referring to Fig. 1, the frame of the injection molding machine substantially consists of two side plates 1 and crossheads 2, 3, 4, 5, 6 and 7, which separate the plates as well as rigidly connect them.

Two longitudinal struts 8, 8a are firmly secured to upper cross-heads 3, 5 and 6, upon which there are displaceably mounted the cross-head 10 which carries the movable part of mold 9 and cross-head 11 to which is attached the other part 12 of the mold. Two springs 14 mounted on struts 8, 8a serve to normally hold cross-head 11 in abutment with adjustable stops 13. The springs 14 abut with their other ends on the fixed cross-head 5. This cross-head carries the cylinder 15 which in known manner is provided with a feed opening 16 and a nozzle orifice 17. The nozzle orifice is arranged on a line with the extrusion opening of the injection mold provided in the mold part 12.

The upper fixed cross-heads 5 and 6 are furthermore joined by two longitudinal struts 18, 18a, on which a cross-head 19 is displaceably mounted. This cross-head is joined with ram 20 in which the cylinder 15 is mounted for displacement in longitudinal direction.

Two rods 21, variable in length, link displaceable cross-head 10 carrying the mold part 9 and arms 22 of the double levers 22, 23. Rods 24, which with one end are linked to lugs 25 of cross-head 26 are, with their other ends, linked to arm 23 of levers 22, 23, which in turn are movably mounted on fixed cross-head 3.

Rods 27 link the upper displaceable cross-head 19 which carries the ram 20, and double levers 28, 29 movably mounted to the fixed cross-head 6. The lower arms 29 of the double levers 28, 29 and lugs 31 of displaceable cross-head 32, are linked by means of rods 30.

The lever systems 21—24 on the one hand, and 27—30 on the other hand, form two systems of knee-levers for moving the displaceable cross-heads 10 and 19.

The cross-heads 26 and 32 are slidably mounted on two longitudinal struts 33 and 33a, which are carried by the lower fixed cross-heads 2 and 7 (see Fig. 3). Moreover, a further cross-head 34 is displaceably mounted on these two struts between cross-heads 26 and 32. The path of cross-head 26 is defined by stop sleeves 35 on one side, and 36 on the other side, which sleeves are arranged on the longitudinal struts 33 and 33a. Similarly, the path of cross-heads 32 and 34 is limited by the stop sleeves 36 on the one side and by the sleeves 37 on the other side which are provided on the right-hand ends of struts 33, 33a.

A rotary spindle 38 is longitudinally and movably mounted in the lower fixed cross-heads 2 and 4 and rests with its free right end in a bearing 39 fastened to cross-head 34, which end has a stop 40 which fits into the recess of bearing 39 so that cross-head 34 is forced to follow longitudinal displacements of the control spindle 38.

A threaded portion 41 is located between cross-heads 4 and 34, and extends through the bore of cross-head 26 which is threaded to receive portion 41.

A cogwheel 42 is fitted upon that part of the control spindle 38 which is positioned between the fixed cross-heads 2 and 4. This cogwheel is fastened to this spindle by means of a key 43 and of a longitudinal groove 44 provided in the spindle so that it transmits rotating movements to the spindle, but does not prevent the spindle from being longitudinally displaced with respect to its own position. A gear 45 which is mounted upon a shaft 46 meshes with the cogwheel 42. The shaft carries a pulley 47 which is linked by means of belts or the like 48 with a pulley 50 provided on the shaft of an electric motor 49.

Two bolts 51 are fastened to the cross-head 34 and extend through corresponding borings of cross-head 32 and are each provided with an impact cap 52 serving as a stop for cross-head 32. The bolts 51 carry springs 53 arranged between the cross-heads 32 and 34, which springs normally separate the cross-heads by a distance, as illustrated in Fig. 3, which is determined by the length of the bolts 51.

The displaceable cross-head 26 has at each of its two ends a lug 54 which extends through an opening in the side plate 1 of the machine and into a slit 55 of a control rod 56 mounted on the machine frame for longitudinal displacement. In the position of cross-head 26 illustrated in Fig. 3, the lug 54 abuts on the right-hand limit of the slit 55, and has therefore moved the control rod 56 into its right-hand terminal position. In this terminal position, a lug 57 provided on control rod 56 has released a lock bolt 59 which is under the action of a spring 58 and which with its front end has entered recess 60 of cross-head 34. In this manner, the cross-head 34 is prevented from being displaced longitudinally on struts 33, 33a. When cross-head 26 has arrived in the left-hand terminal position as illustrated in Fig. 7, the lug 54 has been abutted on the left-hand limit of slit 55 and has moved the control rod 56 into the left-hand terminal position (Fig. 7) in which the lock bolt 59 is moved out of its locking position by means of the lug 57 so that cross-head 34 is freely movable on the struts 33, 33a.

On each side of cross-head 34 there is mounted in a cylindrical recess a piston assembly 61 which normally is in its front terminal position under the action of a spring 62 provided in the cylindrical recess. The piston rods 61 each act upon one arm of a lever 63 movably mounted on the sleeves 36, while the other end of the lever acts upon the control rod 56. When cross-head 34 reaches the left terminal position as illustrated in Fig. 3, the piston rods 61 meet levers 63, which by their rotary movement displace the control rods 56 so that the lock bolts 59 under the action of springs 58 will lock crosshead 34 by means of recess 60.

The mode of operation of the machine is as follows:

At the beginning of an injection operation, the parts of the machine have the positions illustrated in Figs. 1–3, i. e. the mold 9, 12 is open, the ram 20 is in its outside terminal position and cross-head 34 is locked by bolts 59.

Upon starting the electric motor 49, the control spindle 38 is rotated. At first the spindle is prevented from being longitudinally displaced, because the cross-head 34 is fixed in position by bar bolts 59. Due to the rotation of control spindle 38, the cross-head 26 is displaced to the left by the threaded element 41, and simultaneously cross-head 10 and the movable mold part 9 respectively are moved towards the mold part 12, by means of the knee-lever system 21—24. This movement will continue until mold part 9 abuts on mold part 12 and until the mold now closed has been moved together with cross-head 11 so far against fixed cylinder 15 that the injection opening of the mold is firmly pressed against the nozzle opening 17 of the fixed cylinder 15. At this moment the parts have the terminal positions illustrated in Figs. 6 and 7. Shortly before this terminal position is reached, the lugs 54 of cross-head 26 move the control rods 56 into the left-hand terminal positions so that the lock bolts 59 are moved out of recess 60 of cross-head 34 by means of lugs 57.

Thereupon, cross-head 26, which cannot be moved further due to the abutment of the closed mold 9, 12 on the nozzle end of the fixed cylinder 15, becomes a fixed support for the spindle 38, which upon further rotary movement threads its way through the threaded boring of cross-head 26 and moves to the right in a longitudinal direction. Accordingly, cross-head 34 is now moved to the right on struts 33, 33a; thereby it pushes along cross-head 32 by means of strong springs 53 which at this time are not compressed. The movement of cross-head 32 is transmitted to cross-head 19 and thus to ram 20 by means of knee-lever system 27—30. The injection operation is now performed in which the injection material confined in the cylinder 15 is transferred under high pressure through nozzle 17 into the closed injection mold 9, 12.

The knee-lever system 21—24, by adjusting the length of rods 21, is suitably regulated so that the knee-levers 21 and 22 do not reach their extreme position when the mold is closed, and cross-head 26 has also not as yet been brought into abutting position against sleeves 35. In this case, the pressure for closing the mold is equalized by the pressure exerted on ram 20; i. e. with increasing pressure in the cylinder 15, the parts of the mold will likewise be pressed together more firmly.

Until the driving motor 49 is switched off, cross-head 34 will keep on moving with simultaneous compression of springs 53. Thus, these springs act as buffers which, after termination of the injection proper, absorb the power which continues to be introduced into the driving means; damage or excessive stress of the machine parts are thus avoided.

Upon compression of springs 53, the bolts 51 move through the borings of cross-head 32, as shown in Fig. 7.

The return of the machine parts subsequent to the injection operation takes place in reversed order. The direction of rotation of the driving motor 49 and thus of the control spindle 38 is reversed so that the control spindle moves towards the left in the cross-head 26 which acts as an abutment, and thereby moves the cross-head 34 by means of stop 40. The springs 53 are released and bolts 51 pull cross-head 32 along by means of their caps 52, in consequence whereof the knee-lever system 27—30 and the ram 20 are returned into the initial positions illustrated in Fig. 1.

As soon as cross-head 34 abuts on sleeves 36, the longitudinal displacement of the control spindle 38 is discontinued and from this point on the spindle will execute only a rotary movement. The control rod 56 has been returned into its initial position as illustrated in Fig. 3 by the action of piston rod 61 and lever 63; in this position the lock bolts 59 enter recesses 60 of cross-head 34 and lock the latter in place.

Upon further movement of the control spindle, cross-head 26 likewise moves towards the right into its initial position, whereby this cross-head moves cross-head 10 towards the left by means of the knee-lever system 21—24, so that the mold 9, 12 is re-opened. Likewise cross-head 11 which carries the mold part 12, under the action of springs 14, returns to its initial position which is fixed by stops 13. In this position, the injection opening of mold part 12 is distanced from the nozzle orifice of the cylinder. As soon as cross-head 26 abuts on sleeves 36, the cycle is finished and motor 49 is turned off. The machine is then ready for new operation.

Fig. 8 schematically illustrates the necessary electric wiring system for the control of driving motor 49.

The three phase electric motor 49 is fed from the line 72 by way of a reversing switch 70 and of a relay 71 of customary construction. The main control contacts A1 and A2 are arranged in the phase circuit which leads into the injection molding machine. The contact A1 is opened by means of a control attachment provided on cross-head 26, whereby the supply of current for the motor 49 is shut off as soon as cross-head 26 has reached its initial position, which corresponds with the position illustrated in Fig. 1.

Contact A2 is carried by cross-head 32 and opened by cross-head 34 as soon as the latter approaches cross-head 32 at the end of the injection with compression of springs 53. Likewise in this case, the motor is shut off upon opening of the contact.

A contact A3 provided on the stop sleeve 37 is located in the same circuit as is contact A2 and its purpose is to shut off the current for motor 49 in the event that cross-head 32 should reach its extreme right terminal position, which is fixed by the stop sleeves 37, without allowing cross-head 34 to approach it with compression of springs 53. This will occur, for instance, when the cylinder 15 contains no or not sufficient quantity of injection material.

Two further contacts A4 and A5 are provided in the same circuit as is contact A2, of which contact A5 is normally open, but is closed by cross-head 26 as soon as the latter has reached its left-hand terminal position as fixed by the impact sleeve 35. The contact A4 on the other hand is opened at each working stroke of the machine by means of a control lug 74 provided on cross-head 34.

In normal operation, contact A5 is first closed by cross-head 26, so that after the subsequent opening of contact A4, the supply of current for the motor by way of the auxiliary circuit 75, which passes over contact A4 is assured until contacts A2 or A3 which switch off the motor, are opened.

Contacts A4 and A5 are provided for reasons of safety. If cross-head 26 does not completely move into its left-hand terminal position, but is stopped prematurely by any foreign substance located between mold parts 9 and 12, further operation is discontinued by the opening of contact A4.

Operation of switch 70 selectively effects forward or reverse movement of the motor, or even complete shutting off of the motor, from the supply of current.

I claim:

1. In a machine for injection molding of thermoplastic materials provided in known manner with two mold members mounted for movement relative to one another, a rigidly mounted injection cylinder, one of said mold members being mounted to engage the injection cylinder and having a sprue opening, and with a nozzle on said cylinder seatable in said sprue opening, the improvement of the mechanism to open and close the molds and reciprocate the injection plunger in the cylinder which comprises a rotatable shaft having a driving gear adjacent one end, means for splining said gear to the shaft in such a way as to allow axial movement of the shaft in the gear, a threaded portion on said shaft adjacent its other end, a threaded element slidably mounted on and positioned near said other end when the mold is in open position, means for preventing rotation of said element on said shaft, locking means provided at said other end of the shaft to prevent axial movement of the shaft during rotation and sliding movement of the threaded element on the shaft toward said one end of the shaft, means attached to the other mold member and said threaded element operating to move said other mold member against said one mold member and to effect seating of the cylinder nozzle in the sprue opening during the movement of said threaded element toward said one end of said shaft, means operable to release said locking means after closure of the mold whereby further rotation of said shaft in said threaded element effects longitudinal displacement of said shaft, and means connected to said other end of said shaft and to said plunger operable through said longitudinal displacement to force the plunger into the injection cylinder and thereby effect filling of the mold.

2. A device for injection molding in accordance with claim 1 wherein the means for preventing rotation of the crosshead on the shaft is a pair of struts mounted parallel to the shaft.

3. A device for injection molding in accordance with claim 1 wherein the locking means comprise a recessed crosshead in abutting relation with said other end of the shaft, a rigidly mounted cylinder provided with a spring-actuated lock-bolt adapted to engage said recessed crosshead, a cam adapted to disengage said lock-bolt from the recessed crosshead against the action of the spring, said cam being actuated by the threaded crosshead at the end of its movement toward said one end.

4. A device for injection molding in accordance with claim 1 wherein the means attached to said other mold member and the threaded crosshead comprises a knee-lever system, one member of which connected with said other mold member is adjustable in length.

5. A device for injection molding in accordance with claim 1 wherein the means connected to said other end of the shaft and the plunger comprises a knee-lever system and a slidably mounted crosshead in abutment with said other end of said shaft.

6. A device for injection molding in accordance with claim 1 wherein an electric motor is provided to actuate the driving gear of the shaft, a power circuit is provided to feed said motor, and a plurality of contacts are arranged in said circuit operative to be broken upon termination of the plunger stroke and upon return of the mold parts and plunger into initial position.

GERHARD THILENIUS.